(12) United States Patent
Gerard

(10) Patent No.: US 11,579,383 B2
(45) Date of Patent: Feb. 14, 2023

(54) WAVEGUIDE COMPRISING A MULTIMODE OPTICAL FIBRE AND DESIGNED TO SPATIALLY CONCENTRATE THE GUIDED MODES

(71) Applicant: COMMISSARIAT A L'ENERGIE ATOMIQUE ET AUX ENERGIES ALTERNATIVES, Paris (FR)

(72) Inventor: Jean-Michel Gerard, Grenoble (FR)

(73) Assignee: COMMISSARIAT A'LENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/447,596

(22) Filed: Sep. 14, 2021

(65) Prior Publication Data
US 2022/0082765 A1 Mar. 17, 2022

(30) Foreign Application Priority Data
Sep. 14, 2020 (FR) ...................... 20 09299

(51) Int. Cl.
*G02B 6/42* (2006.01)
(52) U.S. Cl.
CPC ................... *G02B 6/4203* (2013.01)
(58) Field of Classification Search
None
See application file for complete search history.

(56) References Cited

U.S. PATENT DOCUMENTS

| | | | |
|---|---|---|---|
| 5,647,041 A * | 7/1997 | Presby | G02B 6/4203 385/39 |
| 9,746,614 B2 * | 8/2017 | Stern | G02B 6/14 |
| 2009/0020839 A1 | 1/2009 | Furuyama | |
| 2017/0176697 A1 | 6/2017 | Polleux et al. | |

(Continued)

FOREIGN PATENT DOCUMENTS

| WO | WO 2019/032227 A2 | 2/2019 |
|---|---|---|
| WO | WO 2019/032227 A3 | 2/2019 |

OTHER PUBLICATIONS

French Preliminary Search Report dated May 11, 2021, in French Application 20 09299 filed on Sep. 14, 2020, 11 pages (with English Translation of Categories of Cited Documents & Written Opinion).

(Continued)

*Primary Examiner* — Omar R Rojas
(74) *Attorney, Agent, or Firm* — Oblon, McClelland, Maier & Neustadt, L.L.P.

(57) ABSTRACT

A waveguide including a multimode optical fiber joined to a structure for concentrating the guided modes spatially. The concentrating structure exhibits an adiabatic variation in its transverse dimension $d_{pc}$ in the direction of its exit face, and its transverse dimension $d_{pc}$ has a value $d_{pc,in}$ at least equal to a value $d_{fc}$ of the transverse dimension $d_{fc}$ of the core of the multimode optical fiber at the second face thereof.

14 Claims, 4 Drawing Sheets

(56) References Cited

U.S. PATENT DOCUMENTS

2020/0132925 A1 4/2020 Drachenberg et al.

OTHER PUBLICATIONS

Eisaman et al., "Invited Review Article: Single-photon sources and detectors", Review of Scientific Instruments 82, 2011, 25 pages, Jul. 2011.

Xi-Bin Wang et al., "Thermal UV treatment on SU-8 polymer for integrated optics", Optical Materials Express, vol. 4, No. 3, Mar. 1, 2014, pp. 509-517.

* cited by examiner

WAVEGUIDE COMPRISING A MULTIMODE OPTICAL FIBRE AND DESIGNED TO SPATIALLY CONCENTRATE THE GUIDED MODES

TECHNICAL FIELD

The field of the invention is that of waveguides comprising a multimode optical fibre. The invention especially relates to such a multimode waveguide suitable for spatially concentrating the guided modes.

PRIOR ART

Multimode optical fibres allow an optical signal to be guided while supporting various propagation modes. Such fibres are particularly useful notably when applied to detection of optical signals of low flux, for example in the context of astronomy or the context of laser remote sensing (LIDAR), since such multimode optical fibres conventionally have a high numerical aperture and a radial dimension that is large compared to the wavelength λ of the optical signal, thus optimizing the efficiency of collection by the multimode optical fibre of the incident optical signal.

However, there is a requirement for a waveguide comprising a multimode optical fibre, this guide needing to be able to spatially concentrate the guided modes onto an exit face while minimizing the optical losses associated with such a spatial concentration.

This is notably the case when the optical signal is intended to be transmitted in the direction of a photodetector the detection region of which has dimensions smaller than those of the multimode optical fibre. Thus, by way of example, a multimode optical fibre suitable for guiding an optical signal of 1.55 μm wavelength may have a transverse dimension of the order of several hundred microns, a diameter of 300 μm for example. However, a SPAD (single photon avalanche diode) or SNSPD (superconducting nanowire single-photon detector) may have a detection region of the order of a few tens of microns, for example only 20 μm, in side-length.

Moreover, optical fibres the end of which is adiabatically tapered are known; however, it is generally a question of single-mode optical fibres. Specifically, the adiabatic taper of the core of the fibre, if applied to a multimode optical fibre, would lead to the generation of high optical losses.

Moreover, document US2017/176697A1 describes an optical coupling structure that ensures coupling between a multimode fibre and a photodetector. This optical coupling structure comprises, integrally formed and made of the same material, an upstream portion that lies laterally on either side of the multimode fibre so as to then form feet that bear against the photodetector, and a downstream portion of frustoconical shape.

Lastly, document WO2019/032227A2 describes a tapered optical fibre that transforms the shape of the guided modes between a rectangular entrance end and a circular exit end. The optical source of the light beam, which source is coupled to the tapered optical fibre, has a numerical aperture that is sufficiently low to excite, at the entrance end of the tapered optical fibre, only a low number of guided modes (of low order), said modes being guidable to the circular exit end.

DISCLOSURE OF THE INVENTION

The objective of the invention is to at least partially remedy the drawbacks of the prior art, and more particularly to provide a waveguide comprising a multimode optical fibre and designed to spatially concentrate the guided modes onto its exit face, while minimizing the optical losses associated with such a spatial concentration. The waveguide may be dimensioned to transmit and concentrate a very high number of optical modes with minimal losses, for example at least 1000 or even at least 10,000 (for example a few tens of thousands).

To this end, one subject of the invention is a multimode waveguide, comprising an optical fibre that comprises a core made of a material of refractive index $n_{fc}$ and having a transverse dimension $d_{fc}$ encircled by a cladding made of a medium of refractive index $n_{fg}$ lower than $n_{fc}$; and that extends longitudinally along an optical axis Δ between a first face intended to receive an optical signal, and an opposite second face intended to transmit the optical signal.

The multimode waveguide further comprises a concentrating structure, which is of frustoconical shape centred on the optical axis Δ, has an entrance face via which the concentrating structure is optically coupled and joined to the second face of the multimode optical fibre, and an opposite exit face having an area smaller than that of the entrance face, and which is made of at least one material of high refractive index $n_{pc}$ higher than $n_{fc}$, has a local transverse dimension $d_{pc}$, and is encircled by a medium of refractive index $n_{pg}$ lower than $n_{pc}$.

The concentrating structure exhibits an adiabatic variation in its local transverse dimension $d_{pc}$ ranging from the value $d_{pc,in}$ at the entrance face to a value $d_{pc,out}$ at the exit face. The value $d_{pc,in}$ of the local transverse dimension $d_{pc}$ is at least equal to a value $d_{fc}$ of the transverse dimension $d_{fc}$ of the core of the multimode optical fibre at the second face. The concentrating structure is configured so that the number of optical modes supported at the exit face is at least equal to the number of optical modes supported by the multimode optical fibre.

In addition, the concentrating structure has a frustoconical shape over its entire length, between the entrance face and the exit face. It is joined to the second face of the multimode optical fibre, either via contact between the second face and the entrance face, or via an antireflection layer placed between the second face and the entrance face. It is encircled over its entire length by a cladding of refractive index $n_{pg}$ lower than $n_{pc}$.

The following are certain preferred but non-limiting aspects of this multimode waveguide.

The number of supported optical modes at the exit face may be at least equal to 40 or even to 1000, or even to 10,000. The concentrating structure is configured so that the relationship $(n_{pc}^2 - n_{pg}^2) \times d_{pc,out}^2 \geq (n_{fc}^2 - n_{fg}^2) \times d_{fc}^2$ is respected.

The high-index material of the concentrating structure may be a crystalline semiconductor having a refractive index $n_{pc}$ higher than $n_{fc}$.

The high-index material of the concentrating structure may be a group-IV element or compound, or may be a III-V compound.

The concentrating structure may exhibit a continuous longitudinal variation $d_{pc}(z)$ in the transverse dimension $d_{pc}$.

The longitudinal variation $d_{pc}(z)$ in the transverse dimension $d_{pc}$ may have over its entire length a local slope less than or equal, in absolute value, to 20°.

The longitudinal variation $d_{pc}(z)$ in the transverse dimension $d_{pc}$ may be decreasing over at least a portion of the concentrating structure ending on the downstream face.

The longitudinal variation $d_{pc}(z)$ in the transverse dimension $d_{pc}$ may be increasing over a portion of the concentrating structure extending from the upstream face.

The concentrating structure may have a length $L_p$ at least equal to two times the value $d_{fc}$ of the transverse dimension $d_{fc}$ of the core of the multimode optical fibre at the second face.

The concentrating structure is preferably axisymmetric about the optical axis.

The ratio $d_{pc,in}/d_{pc,out}$ may be higher than or equal to 2.

The invention also relates to a light-emitting device comprising a light source and the multimode waveguide according to any one of the preceding features, the multimode waveguide being optically coupled to the light source via the first face of the multimode optical fibre.

The invention also relates to a photodetection device comprising a photodetector and the multimode waveguide according to any one of the preceding features, the multimode waveguide being intended to transmit, via the exit face, an optical signal of wavelength λ in the direction of the photodetector, the exit face making contact with a receiving surface of the photodetector, which receiving surface is intended to receive the optical signal, or is spaced apart therefrom by a distance smaller than or equal to λ/n, where n is the refractive index of a medium located between the exit face and the receiving surface of the photodetector.

The invention also relates to a process for manufacturing a multimode waveguide according to any one of the preceding features, comprising the following steps: producing at least one parallelepipedal segment made of the high-index material of the concentrating structure, from a wafer of the same material; joining the parallelepipedal segment to the second face of the multimode optical fibre; machining the parallelepipedal segment so as to obtain the adiabatic variation in the local transverse dimension $d_{pc}$ of the parallelepipedal segment, thus obtaining the concentrating structure.

The invention also relates to a process for manufacturing a multimode waveguide according to any one of the preceding features, comprising the following steps: producing a frustoconical segment on the second face of the multimode optical fibre; depositing an encapsulating layer covering at least the frustoconical segment; removing the frustoconical segment by selectively etching the material thereof, thus freeing up an empty space bounded by the encapsulating layer; depositing the high-index material of the concentrating structure thus filling the empty space, and thus forming the concentrating structure.

BRIEF DESCRIPTION OF THE DRAWINGS

Other aspects, aims, advantages and features of the invention will become more clearly apparent on reading the following detailed description of preferred embodiments thereof, which description is given by way of non-limiting example with reference to the appended drawings, in which.

DETAILED DISCLOSURE OF PARTICULAR EMBODIMENTS

In the figures and in the remainder of the description, the same references have been used to designate identical or similar elements. In addition, the various elements have not been shown to scale for the sake of clarity of the figures. Moreover, the various embodiments and variants are not mutually exclusive and may be combined with one another. Unless indicated otherwise, the terms "substantially", "about" and "of" the order of mean to within 10%, and preferably to within 5%. Moreover, the terms "comprised between . . . and . . . " and equivalents mean that the bounds are included, unless indicated otherwise.

The invention relates to a multimode waveguide designed to guide an optical signal while spatially concentrating the guided modes onto an exit face of small size, with optical losses, associated with this spatial concentration, that are minimal. By spatial concentration of the guided modes, what is meant here is a lateral concentration of the optical intensity of the guided modes. In other words, the spatial distribution of the optical intensity of the guided modes, in a transverse plane that is orthogonal to the optical axis Δ of the multimode waveguide, is, at the exit face, of small dimension.

As detailed below, the multimode waveguide according to the invention comprises a multimode optical fibre that is optically coupled and joined to an added structure, called the frustoconical concentrating structure or multimode concentrator below, which ensures the spatial concentration of the guided modes onto the exit face.

Such a multimode waveguide may notably be used in the context of a detecting optoelectronic device, the latter comprising the multimode waveguide according to the invention and a photodetector, for example a quantum photodetector or an uncooled photodetector (microbolometer), inter alia. It may also be used in the context of an emitting and transmitting optoelectronic device, the latter comprising a light source coupled to the multimode waveguide according to the invention. Generally, the multimode waveguide according to the invention may be advantageous in all sorts of fields, such as those of astronomy, telemetry technologies (e.g. LIDAR), fibre-based optical sensors, near-field optical microscopy, quantum optoelectronic technologies, etc.

Figure 1A:
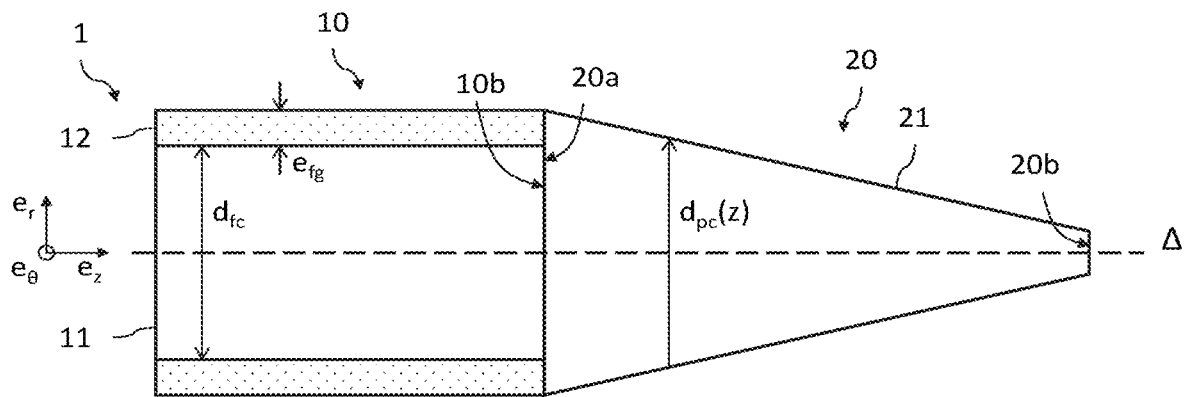
FIG. 1A is a schematic and partial view, in longitudinal cross section, of a multimode waveguide according to one embodiment.

FIG. 1A is a schematic and partial view, in longitudinal cross section, of a multimode waveguide 1 according to one embodiment. FIGS. 1B to 1E illustrate various variants of the multimode waveguide 1 illustrated in FIG. 1A. As mentioned above, the multimode waveguide 1 comprises a multimode optical fibre 10 optically coupled and joined to a frustoconical concentrating structure 20.

At this point an orthogonal three-dimensional direct coordinate system ($e_r$; $e_θ$; $e_z$) will be defined in cylindrical coordinates, the direction $e_z$ being parallel to the longitudinal axis of the multimode optical fibre 10, which axis here defines the optical axis Δ of the multimode waveguide 1, and being oriented in the direction of the exit face 20b of the concentrating structure 20, and the direction $e_r$ being the direction radial from the axis Δ. Reference will be made to this coordinate system in the rest of the description. The terms "downstream" and "upstream" are to be understood to be relative to positions of increasing distance in the direction $e_z$.

The multimode optical fibre 10 is a waveguide that extends longitudinally along an optical axis Δ between a first face called the upstream face (not shown), which is intended to receive an optical signal to be transmitted, and a second face 10b called the downstream face, via which the multimode optical fibre 10 is optically coupled and joined to the frustoconical concentrating structure 20. The downstream face 10b is preferably orthogonal to the optical axis Δ.

It is formed from a core 11 made of at least one material of refractive index $n_{fc}$ encircled by a cladding 12 made of a medium of low refractive index $n_{fg}$, here a solid material. The refractive index $n_{fc}$ is here considered to be a reference value with respect to which we define a lower refractive index (that of the cladding 12) and a higher refractive index (that of the concentrating structure 20). In this example, the multimode optical fibre 10 is a step-index fibre, in the sense that the refractive indices $n_{fc}$ and $n_{fg}$ are constants. As a variant, the multimode optical fibre 10 may be a graded-index fibre in which the refractive index $n_{fc}$ of the core 11 varies in the radial direction $e_r$.

Generally, the core 11 has a transverse dimension $d_{fc}$ along the axis $e_r$ (and therefore a radial dimension $r_{fc}$ from the optical axis Δ), and the cladding has a thickness $e_{fg}$. In this example, the multimode optical fibre 10 has a cylindrical axisymmetric shape. Its cross section is therefore of circular shape at every point on the optical axis Δ. Other shapes of the cross section of the multimode optical fibre are possible, such as an oval or polygonal shape. In this case, the transverse dimension $d_{fc}$ is defined as being the diameter of a disc centred on the optical axis Δ and having the same area as the cross section in question.

The multimode character of the optical fibre 10 results from its high numerical aperture and from its radial dimension $r_{fc}$ which is greater than the wavelength λ of the guided optical signal. Specifically, it is known that an optical fibre exhibits a multimodal regime when the normalized frequency V, thus defined: $V=(2\pi/\lambda) \times r_{fc} \times ON$, is higher than 2.4. Preferably, the optical fibre is here highly multimode, i.e. the normalized frequency V is at least equal to 10, or even to 50 or to 100, and is preferably equal to several hundred. The numerical aperture NA is equal to the square root of the difference of the square of the refractive indices $n_{fc}$, $n_{fg}$ (i.e.: $ON=\sqrt{(n_{fc}^2-n_{fg}^2)}$). In addition, the radial dimension $r_{fc}$ is greater than or equal to the wavelength λ, and for example ten or more times greater. Thus, the radius $r_{fc}$ may be of the order of several microns to several hundred microns.

By way of example, for a wavelength λ of the optical signal equal to 1.55 μm, the multimode optical fibre 10 may have a diameter $d_{fc}$ of 300 μm and be made of a core of silica of index $n_{fc}$ equal to 1.54 and of a cladding material of index $n_{fg}$ equal to 1.46. The multimode optical fibre then has a numerical aperture equal to about 0.5, and a normalized frequency V equal to about 300, and the optical fibre is then highly multimode. Specifically, the number N of modes supported by the multimode optical fibre 10 is conventionally defined as being proportional to the square of the normalized frequency V. Below, the number N of supported modes is considered to be substantially equal to $4V^2/\pi^2$ so that here we have about 35,500 modes.

The waveguide also comprises a concentrating structure 20 optically coupled and joined to the multimode optical fibre 10. This concentrating structure 20 is a multimode spatial concentrator, in the sense that it ensures the spatial concentration of the modes guided to its exit face 20b, which has a small size, with optical losses associated with this spatial concentration that are minimal. It is a question of an added structure in the sense that it is produced separately from the multimode optical fibre 10, from a material of high refractive index higher than the index $n_{fc}$. It is joined to the downstream face 10b of the multimode optical fibre 10.

The concentrating structure 20 is above all designed to guide the optical signal originating from the multimode optical fibre 10. It is made of at least one material (core 21) of high refractive index $n_{pc}$ that is encircled over its entire length by a cladding 22 made of a medium of low refractive index $n_{pg}$ (as illustrated in FIGS. 1A to 1E). The cladding 22 may be a gas, vacuum, or even one or more solid materials. It comprises two faces that are opposite each other along the optical axis Δ, namely an entrance face 20a and an exit face 20b, which faces are preferably orthogonal to the optical axis Δ. The entrance face 20a is the face via which the concentrating structure 20 is optically coupled and joined to the multimode optical fibre 10, and the exit face 20b is the face via which the optical signal is intended to be transmitted out of the multimode waveguide 1. The dimensions of the entrance and exit faces 20a, 20b are defined by the high-index material of the core 21 of the concentrating structure 20. The concentrating structure 20 is moreover made of one or more optically passive materials, i.e. materials that are designed to emit an optical signal at the wavelength of operation of the waveguide 1.

The one or more materials of the concentrating structure 20 are transparent at the wavelength λ of the guided optical signal. The high-index material may be crystalline, and preferably single-crystal, and may be chosen from the elements or compounds of columns III, IV and V of the periodic table. It may thus be a question of a group-IV element or compound, or be a III-V compound. By way of example, it may be a question of silicon when the wavelength λ is comprised between 1.2 and 10 μm, GaAs for the spectral range 0.9-20 μm, or GaP for a wavelength λ longer than 0.5 μm, inter alia. It may comprise a given high-index material, so that the refractive index $n_{pc}$ remains constant in the concentrating structure 20 between the entrance and exit faces 20a, 20b. As a variant, it may be produced in a plurality of segments $21_i$ of high-index materials, arranged successively along the optical axis Δ. The high-index materials of the segments $21_i$ are then distinct from one another in their compositions in terms of chemical elements and/or concentrations of these chemical elements, and have different refractive indices $n_{pc,i}$. In this case, they are preferably arranged successively from the entrance face 20a so that the refractive index $n_{pc,i}$ increases in the direction of the exit face 20b.

Figure 1B:
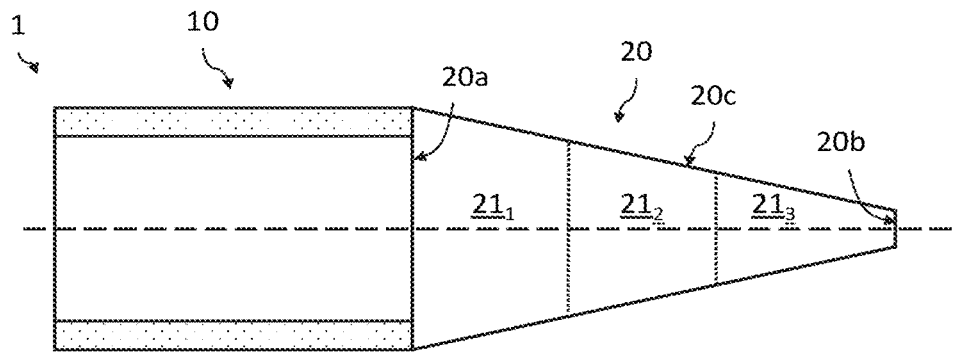
FIGS. 1B to 1E are schematic and partial views, in longitudinal cross section, of a multimode waveguide according to variant embodiments.

In this respect, FIG. 1A illustrates an example of a multimode waveguide 1 in which the concentrating structure 20 is formed solely by a given high-index material, GaAs for example, which defines the entrance and exit faces 20a, 20b. It comprises a cladding formed, not by a low-index material, but by air or vacuum for example. FIG. 1B illustrates a multimode waveguide 1 according to one variant, which differs from that of FIG. 1A essentially in that the concentrating structure 20 here comprises a plurality of high-index segments $21_i$, here three segments of different refractive indices $n_{pc,1}$, $n_{pc,2}$, $n_{pc,3}$, with $n_{pc,1} < n_{pc,2} < n_{pc,3}$, arranged along the optical axis so that the segment $21_1$ of index $n_{pc,1}$ defines the entrance face 20a, that of index $n_{pc,3}$ defines the exit face 20b, and that of index $n_{pc,2}$ is located between the two others.

The concentrating structure 20 is joined to the downstream face 10b of the multimode optical fibre 10 via its entrance face 20a, so as to allow the optical signal transmitted by the optical fibre 10 to be injected into the structure 20. The entrance face 20a is therefore located facing the downstream face 10b. It may be joined by bonding, optionally using an adhesive material or without adhesive material. An intermediate layer, preferably an antireflection layer, may be located at the interface between the downstream face 10b and the entrance face 20a. In other words, the concentrating structure 20 is joined to the second face 10b of the multimode optical fibre 10, either via contact between the second face 10b and the entrance face 20a (as illustrated in FIGS. 1A and 1B), or via an antireflection layer 2 placed between the second face 10b and the entrance face 20a (as illustrated in FIG. 1C).

Figure 1C:
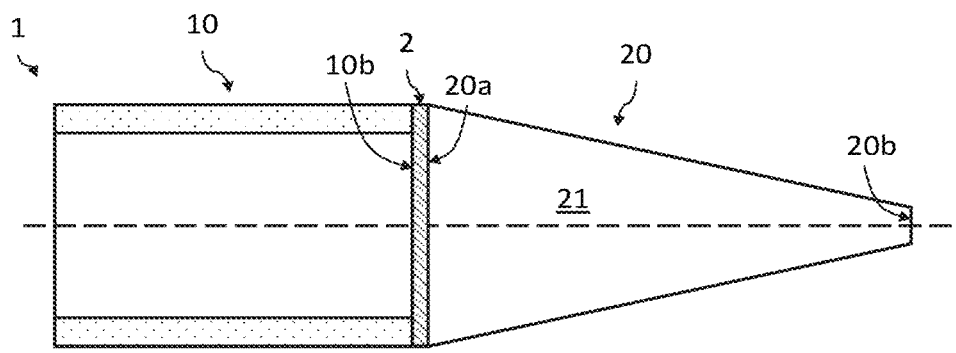

In this respect, FIG. 1C illustrates a multimode waveguide 1 according to one variant, which differs from that of FIG. 1A essentially in that it comprises an antireflection layer 2 located between the downstream face 10b and the entrance face 20a. This antireflection layer 2 has a refractive index $n_{AR}$ equal to about $\sqrt{(n_{fc} \times n_{pc})}$ and a quarter-wave thickness, i.e. a thickness equal to about $\lambda/(4 \times \pi_{AR})$. The presence of such an antireflection layer 2 allows the optical losses associated with reflection of one portion of the optical signal at the interface between the multimode optical fibre 10 and the concentrating structure 20 to be limited. An increase in the transmitted power, which may reach more than 10%, results therefrom. Such an antireflection layer 2 may moreover be produced using a stack of various materials, notably so as to decrease the chromatic dependence of this antireflection optical function, this possibly achieving a further improvement in the optical power transmitted at the interface between the multimode optical fibre 10 and the concentrating structure 20.

The concentrating structure 20 in addition has a frustoconical shape (i.e. a shape of a frustum of a cone) that is centred on the optical axis Δ, with an exit face 20b that has a smaller size than that of the entrance face 20a. The concentrating structure 20 is therefore coaxial with the multimode optical fibre 10. As notably illustrated in FIG. 1A, it is of frustoconical shape over its entire length between the entrance face 20a and the exit face 20b. It therefore does not comprise an upstream portion that is not frustoconical, as in the aforementioned document US2017/176697A1. It is preferably axisymmetric. Thus, the direct coupling to the multimode optical fibre 10 and the presence of a low-index cladding over the entire length of the concentrating structure 20 result in a decrease in optical losses, notably for optical modes of higher orders, which are more difficult to guide.

The cross section of the concentrating structure 20 may be circular (cone of revolution), oval or polygonal with a rotational symmetry about the optical axis Δ, for example one of order 4. It is preferably circular, just like the multimode optical fibre 10, but may be laterally elongate in order to match the potentially elongate shape of the detection or reception region to which the guided optical signal is transmitted.

The entrance and exit faces 20a, 20b are joined to each other by a lateral face 20c (defined by the high-index material), which has a local transverse dimension $d_{pc}(z)$ along the axis $e_r$, here a diameter (and a local radial dimension $r_{pc}(z)$ from the optical axis Δ, here a radius). In the case where the cross section of the concentrating structure 20 has a shape other than circular, the local transverse dimension $d_{pc}(z)$ is defined as being the diameter of a disc having the same area as the cross section in question. The local diameter d(z) has a high value $d_{pc,in}$ at the entrance face 20a and a low value $d_{pc,out}$ at the exit face 20b. The value $d_{min}$ is equal to the value $d_{fc}$ of the diameter of the core 11 of the multimode optical fibre 10 at the downstream face 10b, or is higher therethan so as to allow a good injection of the optical signal into the concentrating structure 20. It may be of the order of several tens to several hundreds of microns, and for example be comprised between about 50 and 500 μm. Moreover, the value $d_{pc,out}$ is lower than the value $d_{min}$, and may be of the order of a few microns to a few tens of microns, and for example be comprised between about 5 μm and 50 μm. Preferably, the ratio $d_{pc,in}/d_{pc,out}$ may be higher than or equal to 2. The local diameter d(z) varies longitudinally monotonically, and for example optionally linearly (affine), over at least one portion of the length $L_p$ of the concentrating structure 20, this portion ending on the exit face 20b.

Thus, the term "frustoconical" is to be understood in the broad sense, i.e. it covers both a conical shape in the strict sense (i.e. the lateral face 20c is entirely defined by a generatrix passing through a fixed point located on the optical axis Δ: the variation d(z) then being linear), and it covers a convex (curved) and/or concave conical shape, the longitudinal variation $d_{pc}(z)$ then not being linear over the entire length of the concentrating structure 20. Thus, it advantageously exhibits an increasing variation from the upstream face 20a (in order notably to improve the injection of the optical signal into the concentrating structure 20), then exhibits a decreasing variation up to the downstream face 20b.

Figure 1D:
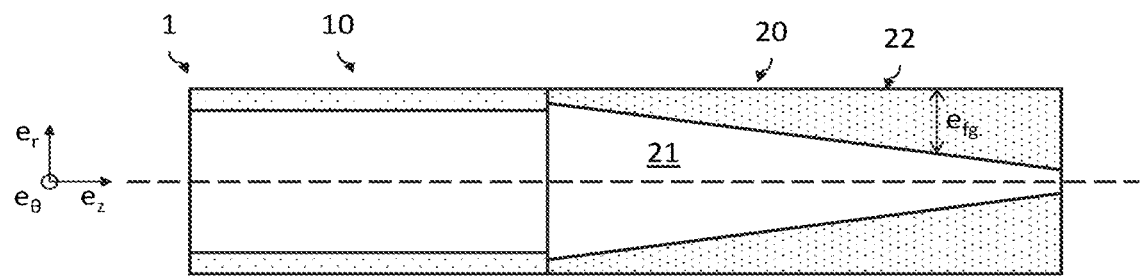
Figure 1E:
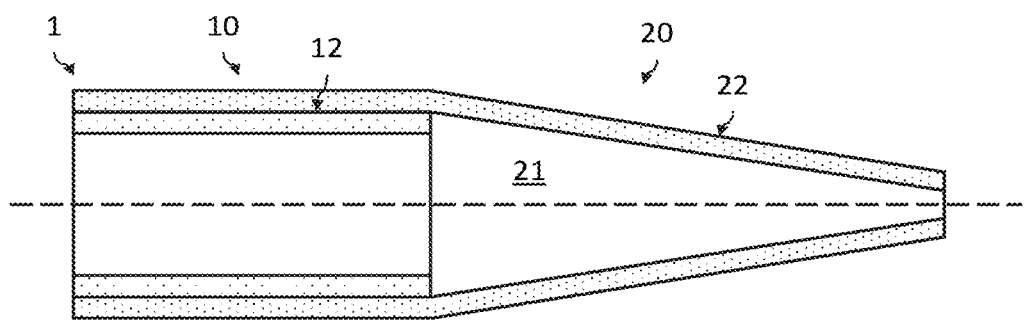

FIGS. 1D to 1E illustrate multimode waveguides 1 according to two other variants, which differ from that of FIG. 1A essentially in that the high-index material 21 of the concentrating structure 20 is covered by a low-index material $n_{pg}$ that forms a cladding 22. In the case of FIG. 1D, the cladding 22 covers only the high-index material of the concentrating structure 20 and does not extend over the multimode optical fibre 10. It has a thickness $e_{pg}(z)$ that increases longitudinally with distance from the multimode optical fibre 10 so that the concentrating structure 20 has a lateral size that is substantially constant along the axis $e_z$, this lateral size here being substantially equal to that of the multimode optical fibre 10. In the case of FIG. 1E, the cladding 22 extends so as to cover the high-index material of the concentrating structure 20 and the cladding 12 of the multimode optical fibre 10. It here has a substantially constant thickness $e_{pg}$.

The concentrating structure 20 is designed to spatially concentrate, onto its exit face 20b, the optical modes of the optical signal originating from the multimode optical fibre 10, i.e. to laterally decrease the spatial distribution of the intensity of the optical modes, with minimal associated optical losses.

10 this end, the concentrating structure 20 is first of all dimensioned and produced so that the number $N_{p,out}$ of supported modes at the exit face 20b is at least equal to the number $N_f$ of modes supported in the multimode optical fibre 10. In other words, generally, the diameter $d_{pc,out}$ of the concentrating structure 20 at the exit face 20b and the one or more materials of the concentrating structure 20 (in terms of refractive index $n_{pc}$, $n_{pg}$) are chosen so that the number $N_{p,out}$ of supported modes at the exit face 20b is at least equal to the number $N_f$ of modes supported in the multimode optical fibre 10. To compute the number $N_{p,out}$ of modes, Maxwell's equations may be solved in the waveguide 1 via numerical simulation, and for example by means of the software package FemSIM (commercially available software package developed by Synopsys). Moreover, in the case where the normalized frequency V is high with respect to 2.4, for example when it is at least equal to 10, it is possible to choose the diameter $d_{pc,out}$ of the concentrating structure 20 and the one or more materials of the concentrating structure 20 (in terms of refractive index $n_{pc}$, $n_{pg}$) so that the following relationship is respected: $(n_{pc}^2 - n_{pg}^2) \times d_{pc,out}^2 \geq (n_{fc}^2 - n_{fg}^2) \times d_{fc}^2$, where $d_{fc}$ is the value of the diameter of the core 11 of the multimode optical fibre 10 at the downstream face 10b. This notably expresses the fact that the high-index material 21 of the concentrating structure 20 has a refractive index $n_{pc}$ higher than that of the core 11 of the multimode optical fibre 10. In addition, the index step between the high-index material of the concentrating structure 20 and the medium that encircles it is large, and for example larger than 2 or more.

Given that the number $N_{p,out}$ of modes at the exit face 20b is at least equal to the number $N_f$ of modes supported by the multimode optical fibre 10, and that the number $N_{p,out}$ of modes is lower than the number $N_{p,in}$ of modes at the entrance face 20a (because of the decrease in the diameter $d_{pc}(z)$), the concentrating structure 20 supports more modes, at every point z, than the multimode optical fibre 10. Thus, the optical losses that would result in a decrease in the number of supported modes between that $N_f$ of the multimode optical fibre 10 and that $N_{p,out}$ at the exit of the concentrating structure 20 are avoided. By way of example, in the case where the multimode optical fibre 10 supports a number $N_f$ of modes of the order of 35,000 for a radius $r_{fc}$ of 150 μm, a concentrating structure 20 made of GaAs (index $n_{pc}$ of about 3.45 for λ of 1.55 μm), the radius $r_{pc,out}$ of which is 25 μm at the exit face 20b, has a number $N_{p,out}$ of modes of the order of 45,000, and therefore at least equal to $N_f$.

In addition, the concentrating structure 20 has a frustoconical shape that has a slow variation, which is qualified adiabatic in the art, in its transverse dimension $d_{pc}(z)$ between the entrance face 20a (of value $d_{pc,in}$) and the exit face 20b (of value $d_{pc,out}$) allowing a continuous modification in the form of the guided modes to be obtained. Thus, to a large extent, the optical power injected into the supported guided modes at the entrance face 20a is not transferred to guided modes of higher-order that are liable not to be supported at the exit face 20b, because of the decrease in the diameter $d_{pc}$ of the concentrating structure 20. Thus, a substantial portion of the power injected into the supported guided modes at the entrance face 20a of the concentrating structure 20 will be transmitted to the exit face 20b. The longitudinal variation $d_{pc}(z)$ is preferably a continuous variation, in the mathematical sense of a continuous function: there are no discontinuities along the concentrating structure 20 liable to degrade the adiabatic character of the propagation of the guided modes. By a discontinuity, what is meant here is an abrupt and substantial variation in the transverse dimension $d_{pc}(z)$ (e.g. a step) to the lateral face 20c, of a value for example at least equal to $\lambda/(50 \times \pi_{pc})$. This value is of course to be contrasted with small discontinuities that are negligible from an optical point of view and inherent to the manufacture of the concentrating structure 20. In addition, the longitudinal variation $d_{pc}(z)$ has, over the entire length of the concentrating structure 20, a local slope that is advantageously lower than or equal, in absolute value, to 20°, or even to 10°, or less even. The value of the local slope is indicated in absolute value, in so far as it may be positive (increasing variation) or negative (decreasing variation). The continuous variation and the low local slope allow the adiabatic character of the propagation of the guided modes and of their gradual concentration along the concentrating structure 20 to be obtained and reinforced.

Moreover, the length $L_p$ of the concentrating structure 20 between the entrance and exit faces 20a, 20b may be at least equal to two times the diameter $d_{fc}$ of the core 11 of the multimode optical fibre 10, and preferably at least equal to five times the diameter $d_{fc}$. Of course, it is possible to more precisely define the longitudinal variation $d_{pc}(z)$ so that it is so-called adiabatic, so as to limit the exchange of power between the various modes supported by the concentrating structure 20 during the propagation. It will also be noted that the adiabatic variation in the transverse dimension $d_{pc}(z)$ of the concentrating structure 20 is desired, not so much to avoid intermodal coupling per se, but to prevent a guided mode from coupling and transferring optical power to a mode of higher-order not supported at the exit face 20b, and thus the generation of optical losses.

Lastly, the concentrating structure 20 is dimensioned so that the value $d_{pc,in}$ of the diameter d at the entrance face 20a is at least equal to the value $d_{fc}$ of the core 11 of the multimode optical fibre 10 at the downstream face 10b. By $d_{pc,in}$ at least equal to $d_{fc}$, what is meant is that $d_{pc,in}$ is at least equal to $d_{fc}$ to within 10%, and preferably to within 5%. Thus, the optical signal guided and confined to the core 11 of the multimode optical fibre 10 is essentially transmitted in the high-index material 21 of the concentrating structure 20. Preferably, the value $d_{pc,in}$ of the diameter $d_{pc}$ at the entrance face 20a is comprised between the values $d_{fc}$ and $d_{fc}+2 \times e_{fg}$.

Thus, the optical signal that propagates through the multimode optical fibre 10 is efficiently injected into the concentrating structure 20. The guided modes propagating through the multimode optical fibre 10 are conventionally $EH_{I,m}$ or $HE_{I,m}$ hybrid modes, where I is an integer number, and m is a non-zero natural integer. At the interface between the multimode optical fibre 10 and the concentrating structure 20, each mode supported by the multimode optical fibre 10 preferably couples to a mode of the same EH or HE nature, and of the same indices I,m. This mode will necessarily exist in the concentrating structure 20 in so far as the number $N_{p,in}$ of supported modes at the entrance face 20a is necessarily higher than the number $N_f$ (the numerical aperture of the concentrating structure 20 being far higher than that of the multimode optical fibre 10). The injection of the optical signal into the concentrating structure 20 is then particularly efficient, and may be limited essentially by the coefficient of reflection R at the interface, which coefficient may be minimized by the presence of the aforementioned antireflection layer. Subsequently, the modes remain guided in the concentrating structure 20 in the direction of the exit face 20b, given that the local number $N_p(z)$ of supported modes is higher than the value $N_{p,out}$. The longitudinal variation in the diameter $d_{pc}(z)$ is said to be adiabatic in so far as it makes the propagation of the guided modes along the concentrating structure 20 adiabatic: the transverse extent of each guided mode gradually decreases, i.e. the spatial distribution of its intensity in the transverse plane $(e_r, e_\theta)$ decreases, as it propagates, and intermodal coupling is limited. To this end, as indicated above, the longitudinal variation in the diameter $d_{pc}(z)$ is continuous and has a local slope lower than or equal, in absolute value, to 20° at every point z along the concentrating structure 20, and preferably lower than or equal to 10% and more preferably lower than or equal to 5%. At the exit face 20b, a substantial portion of the optical signal that was injected is present and spatially concentrated. The optical losses associated with the spatial concentration of the optical signal are therefore minimal.

Figure 2:
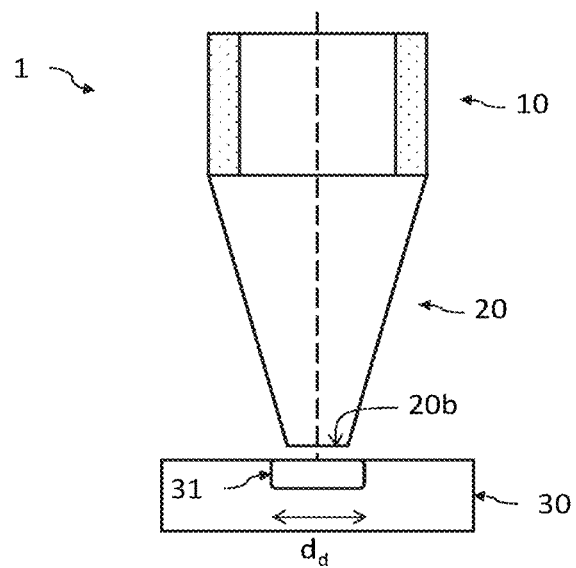
FIG. 2 is a schematic and partial view, in longitudinal cross section, of a detecting device comprising a multimode waveguide that is identical to that illustrated in FIG. 1A and a photodetector.

FIG. 2 is a schematic and partial view of a detecting device comprising a multimode waveguide 1 according to the invention, and that here is identical to that illustrated in FIG. 1, and a photodetector 30. This figure illustrates one of the many applications of such a multimode waveguide 1. The photodetector 30 has a detection region 31 the lateral dimension $d_d$ of which is preferably at least equal to the dimension $d_{pc,out}$ of the exit face 20b. The photodetector 30 may be a SPAD or SNSPD, as mentioned above, or even be a microbolometer or indeed a matrix array of microbolometers with a pitch of the order of 10 μm for example. An SNSPD detector (SNSPD standing for superconducting nanowire single-photon detector) is notably described in the publication by Eisaman et al. titled Single-photon sources and detectors, Rev. Sci. Instrum. 82, 071101 (2011). It may be designed to detect an optical signal the wavelength λ of which may be comprised in the infrared or even in the visible. In this example, the detection region 31 is formed by a p-i-n junction. The exit face 20b of the concentrating structure 20 may be placed as close as possible to the detection region 31, or even make contact therewith. Thus, in the case where the exit face 20b is spaced apart by a non-zero distance from the surface of the detection region 31, this spacing is preferably smaller than or equal to λ/n, where λ is the wavelength of the optical signal transmitted then detected, and n is the refractive index of a medium located between the exit face 20b and the surface of the detection region 31 of the photodetector. A fibre connector (not shown) may be used. An optical adhesive may be used to join the multimode waveguide 1 to the photodetector 30.

As mentioned above, other applications are of course conceivable. Thus, it may be a question of spatially concentrating the guided optical signal and of transmitting it in the direction of a region of an absorbent material with a view to heating it locally. It is thus possible to study its thermal conduction properties, or even to exploit thermal electric effect. In any case, the multimode waveguide 1 according to the invention may be associated with a photodetector placed downstream of the concentrating structure 20, and/or with an optical source of incoherent light placed upstream of the multimode optical fibre 10.

Figure 3A:
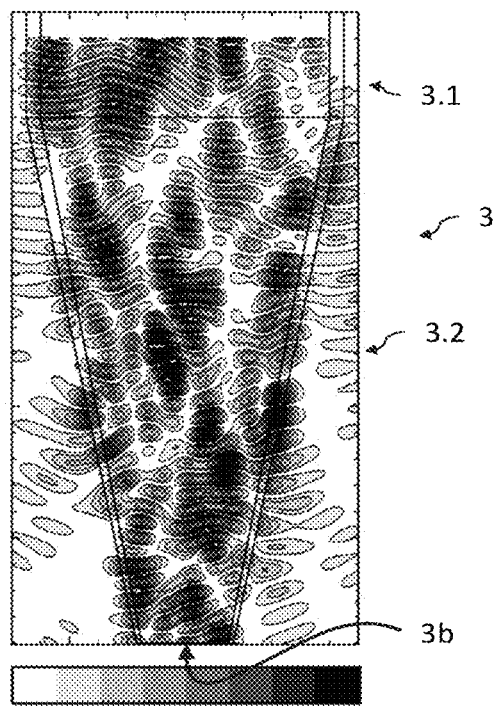
FIG. 3A illustrates a field distribution in the steady state of an optical signal propagating through a tapered multimode optical fibre made of silica and produced in a similar way to tapered single-mode optical fibres made of silica.

FIG. 3A illustrates the field distribution in the steady state of an optical signal propagating through a tapered multimode optical fibre 3 made of silica and produced in a similar way to tapered single-mode optical fibres made of silica. The objective here is to show that the multimode waveguide 1 according to the invention quite obviously differs from tapered silica single-mode optical fibres, which are well-known optical components, but also from silica multimode optical fibres tapered similarly to such single-mode optical fibres.

Specifically, a tapered single-mode optical fibre generally comprises a single-mode first portion of constant diameter $d_{fc}$ that supports only a single optical mode (fundamental mode), which is continued without interruption by a second segment that is said to be tapered and in which the core exhibits a slow decrease in its diameter $d_{fc}$. In this second segment, by slowly decreasing the diameter $d_{fc}$, the form of the mode in the transverse direction is changed: its size begins by decreasing, then, when the diameter $d_{fc}$ becomes smaller than $\lambda/n_{fc}$, the mode spreads out of the guide while remaining guided thereby. Thus, a tapered single-mode optical fibre is used to spread the guided mode and not concentrated, for example to obtain evanescent-wave coupling with an optical resonator.

In the case of multimode optical fibres (MMOF), the diameter $d_{fc}$ is large with respect to the wavelength λ of the optical signal and hence the optical fibre supports a high number of modes. However, decreasing the diameter $d_{fc}$ would lead to a decrease in the number of supported modes, some of the light injected as input into such a fibre then being radiated out of the optical fibre or even reflected. The optical losses associated with such a decrease in the diameter $d_{fc}$ are therefore particularly very high.

In this respect, the tapered optical fibre 3 illustrated in FIG. 3A comprises a cylindrical first segment 3.1 of constant lateral dimension, formed from a core of a diameter $d_{fc}$ of 10 μm encircled by a cladding of 0.5 μm thickness. The refractive index $n_{fc}$ of the (silica) core being equal to 1.54 and the refractive index $n_{fg}$ of the cladding being equal to 1.46, the numerical aperture NA is equal to 0.5. For an optical signal of a wavelength λ of 1.55 pin, the number $N_{f,in}$ of modes supported by the optical fibre in its first segment 3.1 is equal to about 42 (on the basis of the aforementioned definition $N_f \approx 4 \times V^2/\pi^2$). The tapered optical fibre 3 comprises a frustoconical second segment 3.2 the lateral dimension of which decreases linearly, this second segment 3.2 being formed by the taper of the core and of the cladding in the same proportion, for any abscissa Z. At the exit face 3b, the core has a local diameter of 3 μm and the cladding a thickness of 0.15 μm, the length of the second segment 3.2 being 20 μm.

A continuous optical signal (incoherent light randomly distributed between all the guided modes) is injected into the tapered optical fibre 3, and the optical power is measured in the steady state. Only 20% of the initial power reaches the exit face 3b. This is notably explained by the fact that the tapered optical fibre 3 supports a number $N_{f,out}$ of modes equal to about 4 at its exit face 3b. Apart from the 2% of the signal that is reflected, the remaining 78% is radiated out of the tapered optical fibre 3 as the field distribution shows. Therefore, a tapered optical fibre 3 on the one hand does not allow the optical signal to be concentrated, and on the other hand generates high optical losses.

Figure 3B:
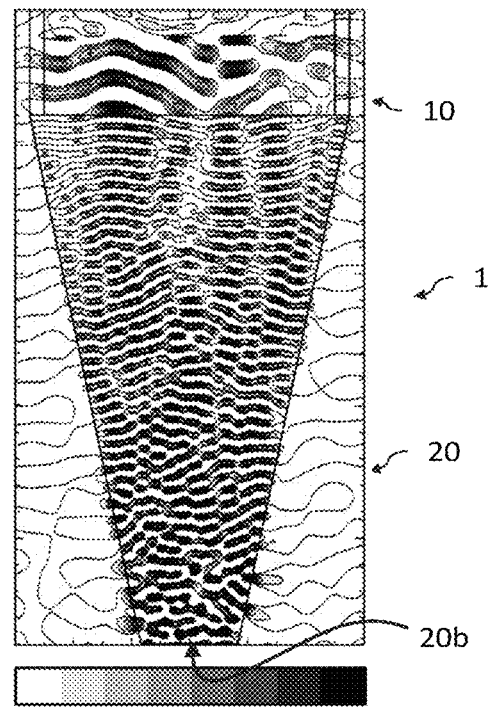
FIG. 3B illustrates a field distribution in the steady state of an optical signal propagating through a multimode waveguide according to one embodiment of the invention.

FIG. 3B illustrates a field distribution in the steady state of an optical signal propagating through a multimode waveguide 1 according to one embodiment of the invention. The multimode waveguide 1 comprises a multimode optical fibre 10 that is identical to the first segment 3.1, formed from a core of diameter $d_{fc}$ of 10 μm encircled by a cladding of 0.5 μm thickness. The refractive index $n_{fc}$ of the core being equal to 1.54 and the refractive index $n_{fg}$ of the cladding being equal to 1.46, the numerical aperture NA is equal to 0.5. For an optical signal of a wavelength of 1.55 μm, the number $N_f$ of modes supported by the multimode optical fibre 10 is equal to about 42. The multimode waveguide 1 comprises a concentrating structure 20 having lateral and longitudinal dimensions that are identical to those of the second segment 3.2 (considering the core and the cladding of this segment 3.2). It is made of GaAs of refractive index $n_{pc}$ of about 3.45, encircled by air ($n_{pg}$=1). At the exit face 20b, the high-index material has a local diameter of 3.3 μm, so that the number $N_{f,out}$ of supported modes at the exit face 20b is equal to about 190.

The optical signal (incoherent light) is injected into the multimode waveguide 1, and the optical power is measured in the steady state. Almost 73% of the power of the optical signal is measured at the exit face 20b, indicating a substantial decrease in optical losses, in comparison to the tapered optical fibre 3. Moreover, almost 12% of the optical signal is reflected at the interface between the multimode optical fibre 10 and the concentrating structure 20, in accordance with the Fresnel coefficient for the reflected power. This value may be greatly decreased with the use of an antireflection layer. In any case, it may be seen that such a waveguide 1 makes it possible to ensure a spatial concentration of the guided modes onto the exit face 20b, the optical losses associated with such a concentration remaining minimal, here of the order of only 17% (defined based on the ratio of the 73% transmitted to the 88% injected into the concentrating structure 20). The field distribution illustrated in FIG. 3B clearly shows, in comparison to FIG. 3A, a large decrease in the optical losses associated with radiation of the light out of the concentrating structure 20.

Figure 3C:
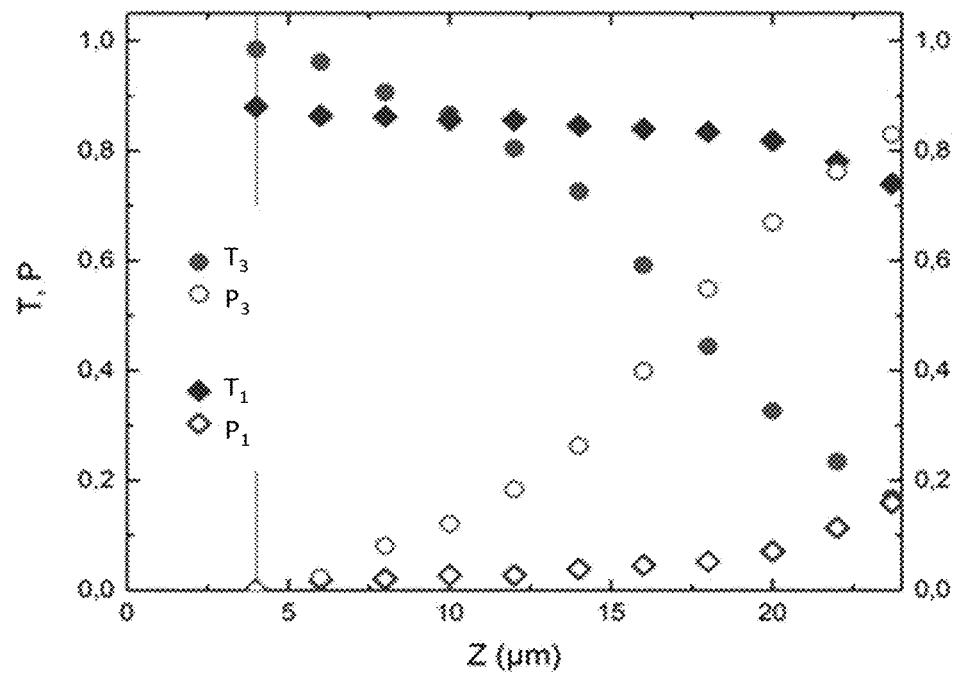
FIG. 3C illustrates the longitudinal variation in the transmission coefficients T(z) and optical losses P(z) associated with the tapered portion of the multimode optical fibre illustrated in FIG. 3A (denoted $T_3$ and $P_3$), and with the concentrating structure of the waveguide illustrated in FIG. 3B (denoted $T_1$ and $P_1$)

FIG. 3C illustrates the longitudinal variation in the transmission coefficients T(z) and optical losses P(z) associated with the tapered portion 3.2 of the multimode optical fibre 3 illustrated in FIG. 3A, and with the concentrating structure 20 of the waveguide 1 illustrated in FIG. 3B. The transmission coefficient T(z) is defined as being equal to the measured power normalized by the power injected into the fibre 3.1 (FIG. 3A) or into the fibre 10 (FIG. 3B), as a function of the position z along the taper 3.2 (FIG. 3A) or along the concentrating structure 20 (FIG. 3B). Moreover, the optical-loss coefficient P(z) is defined as being equal to $1-T(z)/(1-R)$: it is a question of the optical losses associated with the spatial concentration of the guided modes. The coefficients associated with the waveguide 1 are denoted $T_1$ and $P_1$, and the coefficients associated with the multimode optical fibre 3 are denoted $T_3$ and $P_3$.

If the transmission coefficient $T_3(z)$ of the optical fibre 3 is considered, it has a high value at the entrance of the tapered portion 3.2 in so far as there is very little reflection between the right portion 3.1 and the tapered portion 3.2 which are both made of silica. However, it then drops greatly as the exit face 3b is approached (a large portion of the light is radiated to the exterior). The optical losses $P_3(z)$ are distributed over the entire length of the tapered portion 3.2 and reach a total value of about 80% at the face 3b.

In contrast, the waveguide 1, although losses are generated by reflection at the silica/GaAs interface (these losses may however notably be minimized by employing an antireflection layer), has a transmission coefficient $T_1(z)$ that remains at a particularly high value up to the exit face 20b. The optical losses $P_1(z)$ remain particularly low along with the concentrating structure 20, and here reach a total of only 17% at the face 20b. Specifically, the light propagating through the concentrating structure 20 is radiated very little to the exterior and is efficiently concentrated spatially.

Moreover, the table below shows the variation in the coefficient of transmission T of the waveguide 1 at the exit face 20b, and in the reflection coefficient R at the fibre 10/structure 20 interface, as a function of the length $L_p$ of the concentrating structure 20. The diameter $d_{fc}$ of the core 11 of the multimode optical fibre 10 is here considered to be equal to 3 μm, and its cladding 12 has a thickness of 0.5 μm. The concentrating structure 20 is made of GaAs and is frustoconical, axisymmetric and exhibits a linear longitudinal variation in the diameter $d_{pc}$ from 4 μm to 1 μm. The optical losses P associated with the spatial concentration of the guided modes, defined such that $P=1-T/(1-R)$, have also been indicated.

| $L_p$ (μm) | 3 | 5 | 10 | 15 | 20 | 25 | 30 |
|---|---|---|---|---|---|---|---|
| $L_p/d_{fc}$ | 1 | 1.7 | 3.3 | 5 | 6.7 | 8.3 | 10 |
| T (%) | 50 | 63 | 71 | 74 | 75 | 75 | 75 |
| R (%) | 20 | 18 | 14 | 14 | 14 | 14 | 14 |
| P (%) | 37 | 23 | 17 | 14 | 13 | 13 | 13 |

It may be seen that, to the first order, a length $L_p$ of the concentrating structure 20 at least equal to 2 times the diameter $d_{fc}$ of the core 11 of the multimode optical fibre 10 (corresponding to a constant local slope of 15° in absolute value) allows the optical losses P associated with the spatial concentration of the modes guided by the concentrating structure 20 to be limited, these losses here being lower than 20%. Preferably, the length $L_p$ is at least equal to 5 times the diameter $d_{fc}$ (this corresponding to a constant local slope of 6° in absolute value).

Lastly, it will be noted that a concentration factor F of the light intensity such that $T \times d_{pc,out}^2 / d_{pc,in}^2$ may be defined (light intensity is luminous power divided by the area, and hence this concentration factor F, which is a dimensionless number). It may be seen that this concentration factor F may be clearly higher than 1, while minimizing the optical losses P associated with the spatial concentration of the guided modes. In this respect, the table below shows the variation in the concentration factor F and in the optical losses P for various values of the diameter $d_{pc,out}$ of the concentrating structure 20 at the exit face 20b. In this example, the multimode waveguide 1 comprises a multimode optical fibre 10 the core of which has a diameter $d_{fc}$ of 6 μm and the cladding of which has a thickness $e_{fg}$ of 1 μm. It is easy to show by numerical simulation that it supports a number $N_f$ of guided modes equal to 20. The concentrating structure 20 is made of GaAs (high-index material) encircled by air. It has a diameter $d_{pc,in}$ of 8 μm at the entrance face 20a and a length $L_p$ of 20 μm. In this table, the numbers $N_{p,out}$ of guided modes that have been asterisked are exact numbers computed based on the solution of Maxwell's equations by numerical simulation, whereas the unasterisked numbers were estimated using the relationship $N_{p,out}=4 \times V^2/\pi^2$.

| $d_{pc,out}$ (μm) | 3 | 3 + AR | 2.5 | 2.5 + AR | 2 | 2 + AR | 1.5 | 1 | 0.75 | 0.5 |
|---|---|---|---|---|---|---|---|---|---|---|
| $N_{p,out}$ | | 160 | | 110 | | 78 | 45* | 22* | 12* | 4* |
| T (%) | 78 | 91 | 65 | 75 | 48 | 55 | 31 | 15 | 9 | 2.5 |
| R (%) | 14 | 2 | 14 | 2 | 24 | 15 | 30 | 36 | 43 | 43 |
| F | 5.4 | 6.3 | 6.6 | 7.7 | 7.7 | 8.7 | 8.8 | 10.2 | 10.3 | 6 |
| P (%) | 9 | 7 | 24 | 23 | 37 | 35 | 55 | 76 | 84 | 96 |

As a result, the concentration factor F is high for an exit diameter $d_{pc,out}$ smaller than 3 μm. In addition, the optical losses P associated with the spatial concentration are particularly low for $d_{pc,out}$ in the vicinity of 3 μm. Obviously, the optical losses P are very high when the condition $N_{p,out} > N_f$ is not met, i.e. for d<1 µm. For d>1 µm (when the condition is indeed met), it will be noted that the optical losses P increase as the exit diameter $d_{pc,out}$ decreases, in so far as it is difficult to achieve adiabatic conditions for guided modes of high order. Thus, preferably, the waveguide 1 is dimensioned so that the number $N_{p,out}$ is far higher than $N_f$, and for example at least 5 times, or even at least 10 times higher. It will be noted that a similar calculation applied to a tapered multimode optical fibre 3 such as described above shows that the concentration factor F remains similar to one for the entire range of output diameters $d_{pc,out}$, and that the optical losses P are particularly high.

Moreover, as indicated above, the longitudinal variation in the transverse dimension $d_{pc}(z)$ of the high-index material of the concentrating structure 20 is monotonically decreasing over at least one portion of the length $L_p$ (which then ends on the exit face 20b), and may not be linear. Let us now consider the optical performance of the concentrating structure 20 in the case where the longitudinal variation $d_{pc}(z)$ exhibits a parabolic deviation with respect to a linear longitudinal variation (axisymmetric cone). In these examples, the concentrating structure 20 is made of GaAs encircled by air, and has an entrance diameter $d_{pc,in}$ of 8 µm, an exit diameter $d_{pc,out}$ of 2 µm and a length $L_p$ of 20 µm.

In the case of a parabolic deviation 6 of +0.5 µm measured at $L_p/2$ (curved or convex shape), the concentrating structure 20 has a transmission coefficient T of 56%, a reflection coefficient R of 18%, and results in a concentration factor F of 9, and in optical losses P associated with the spatial concentration of 31%. A parabolic deviation 6 of +2 µm improves optical performance, in so far as the transmission coefficient T is 72% and the reflection coefficient R is 16%, this resulting in a concentration factor F of 11 and in optical losses P associated with the spatial concentration of only 14%. It will be noted that, in this example, the longitudinal variation $d_{pc}(z)$ is not monotonic over the entire length $L_p$ of the concentrating structure 20: it starts by increasing from 8 µm to 8.2 µm, then decreases monotonically to 2 µm.

As mentioned above, the exit face 20b may not be circular or polygonal, but rather oval or elliptical. By way of example, a concentrating structure 20 with an elliptical exit face 20b the major axis a of which is equal to 2×√2 and the minor axis b of which is equal to √2 (thus giving an area identical to that of a circular exit face 20b of 2 µm diameter) delivers a good optical performance in terms of transmission (T=52%) and of concentration (F=8). Optical losses are limited along the major axis but are a little higher along the minor axis.

It will be noted that these simulations were carried out by way of example for concentrating structures supporting a relatively low number of guided optical modes (a few tens), for which structures very precise three-dimensional numerical computations could be carried out. The physical principles validated by these computations are applicable in the same way to the case of concentrating structures of larger diameter, supporting many more guided modes, for example at least 1000 or even more.

An example of a process for producing a multimode waveguide 1 such as illustrated in FIG. 1 will now be described. This process in particular allows a concentrating structure 20 having an axial symmetry (cone of revolution) to be produced, the desired longitudinal variation in the transverse dimension $d_{pc}(z)$ to be achieved, and a surface roughness that is low enough to limit intermodal coupling to be obtained.

Firstly, the high-index material 21 of the concentrating structure 20 is chosen, in light of the value $d_{pc,out}$ desired for the transverse dimension $d_{pc}$ at the exit face 20b. The high-index material 21 is transparent to the working wavelength, and preferably crystalline, and advantageously single-crystal, and may notably be chosen from silicon, GaAs and GaP, inter alia, depending on the wavelength λ of the optical signal to be guided. Such a material is conventionally available in the form of a thick wafer of a thickness of several hundred microns. Let us consider by way of example that the chosen high-index material is GaAs.

The GaAs wafer is then thinned to obtain a final thickness equal to or slightly larger than the maximum radial dimension of the concentrating structure 20, and for example equal to the diameter $d_{pc,in}$ at the entrance face 20a. The thinning may be carried out by chemical-mechanical polishing, inter alia.

Parallelepipedal GaAs segments that are separate from one another are then produced by cleaving the GaAs wafer. The parallelepipedal segments thus have a square cross section and a length equal to the length $L_p$ desired for the concentrating structure 20.

One parallelepipedal segment is then joined to the downstream face 10b of a multimode optical fibre 10, for example by means of an optical adhesive. An antireflection layer may have been produced beforehand on the entrance face 20a of the parallelepipedal segment.

The parallelepipedal segment is then machined so as to obtain a concentrating structure 20 exhibiting the desired longitudinal variation $d_{pc}(z)$. Such machining may be carried out using a focused ion beam (FIB). Such a technique allows a shape having a symmetry of rotation or revolution and a low surface roughness to be obtained. It will be noted that the parallelepipedal segment may also be machined before the step of joining to the end of the multimode optical fibre 10. A "machining" technique employing wet chemical etching may also be used, in particular when it is desired to obtain an axisymmetric shape, for example by dipping the parallelepipedal segment fastened to the end of a holder or of the multimode optical fibre 10 into a solution of an etchant.

A cladding made of a low-index material may then be produced so as to cover the high-index material of the concentrating structure 20. The presence of this cladding may act to improve the mechanical strength of the concentrating structure 20, or even also to assist with positioning the exit face 20b of the concentrating structure 20 facing a region for detecting or receiving the optical signal then transmitted by the multimode waveguide 1.

Figure 4:
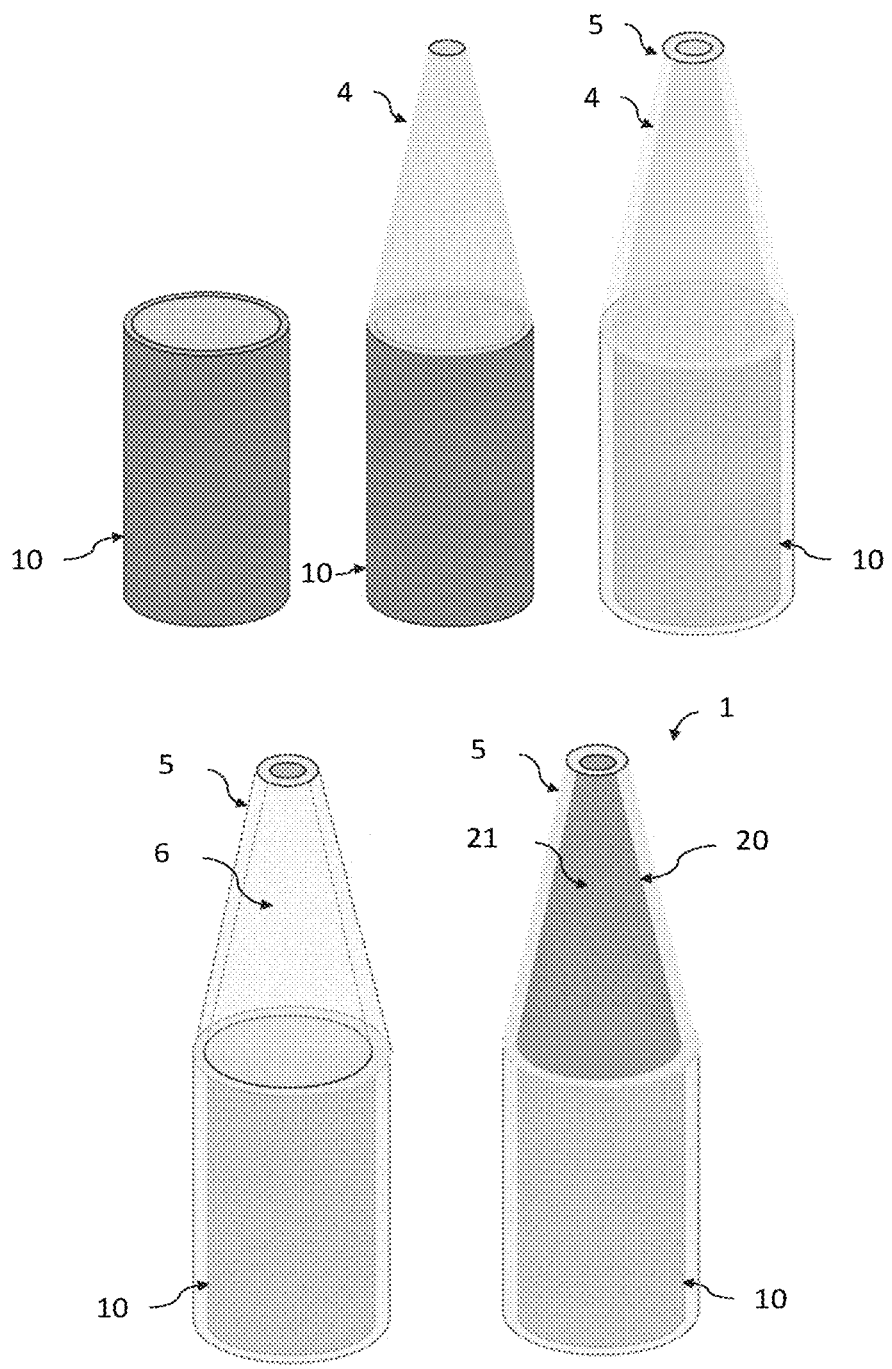
FIG. 4 illustrates various steps of a process for producing a multimode waveguide according to one embodiment.

Other processes for producing the concentrating structure 20 are also possible. By way of example, it may be produced using a step of positive construction followed by a step of double inversion. This process is illustrated in FIG. 4.

A frustoconical segment 4 made of polymer resist is produced on the end of the multimode optical fibre 10. The frustoconical segment 4 is obtained by direct laser writing (DLW). It has the lateral and longitudinal dimensions of the desired concentrating structure 20.

The frustoconical segment 4 and the multimode optical fibre 10 are then encapsulated in an encapsulation layer 5, for example one made of silicon oxide, for example deposited by chemical vapour deposition (CVD).

The frustoconical resist segment 4 is then removed by selective etching. The encapsulation layer 5 then forms a mould that will allow the concentrating structure 20 to be produced.

Lastly, the concentrating structure 20 is produced by depositing, by CVD for example, the high-index material 21 in the free space 6 bounded by the encapsulating layer 5. The latter may be preserved, thus forming a low-index cladding of the concentrating structure 20.

Particular embodiments have just been described. Various modifications and variants will appear obvious to those skilled in the art.

The invention claimed is:

1. A multimode waveguide, comprising:
a multimode optical fibre comprising a core made of a material of refractive index $n_{fc}$ and having a transverse dimension $d_{fc}$, encircled by a cladding made of a medium of refractive index $n_{fg}$ lower than $n_{fc}$; and extending longitudinally along an optical axis $\Delta$ between a first face intended to receive an optical signal, and an opposite second face intended to transmit the optical signal; and
a concentrating structure:
of frustoconical shape centred on the optical axis $\Delta$,
made of at least one material of high refractive index $n_{pc}$ higher than $n_{fc}$,
having an entrance face via which the concentrating structure is optically coupled and an opposite exit face having an area smaller than that of the entrance face, and
having a local transverse dimension $d_{pc}$ the value $d_{pc,in}$ of which at the entrance face is at least equal to a value $d_{fc}$ of the transverse dimension $d_{fc}$ of the core of the multimode optical fibre at the second face, wherein
the concentrating structure:
is of frustoconical shape over its entire length between the entrance face and the exit face, and encircled over its entire length by a medium of refractive index $n_{pg}$ lower than $n_{pc}$;
is joined to the second face of the multimode optical fibre, either via contact between the second face and the entrance face, or via an antireflection layer placed between the second face and the entrance face;
exhibits an adiabatic variation in its local transverse dimension $d_{pc}$ ranging from the value $d_{pc,in}$ to a value $d_{pc,out}$ at the exit face;
is configured so that the number of optical modes supported at the exit face is at least equal to the number of optical modes supported by the multimode optical fibre; and
is configured to satisfy the relationship $(n_{pc}^2 - n_{pg}^2) \times d_{pc,out}^2 \geq (n_{fc}^2 - n_{fg}^2) \times d_{fc}^2$.

2. The multimode waveguide according to claim 1, wherein the concentrating structure is axisymmetric.

3. The multimode waveguide according to claim 1, wherein the high-index material of the concentrating structure is a crystalline semiconductor having a refractive index $n_{pc}$ higher than $n_{fc}$.

4. The multimode waveguide according to claim 1, wherein the high-index material of the concentrating structure is a group-IV element or compound, or is a III-V compound.

5. The multimode waveguide according to claim 1, wherein the concentrating structure exhibits a continuous longitudinal variation $d_{pc}(z)$ in the transverse dimension $d_{pc}$.

6. The multimode waveguide according to claim 5, wherein the longitudinal variation $d_{pc}(z)$ in the transverse dimension $d_{pc}$ has over its entire length a local slope less than or equal, in absolute value, to 20°.

7. The multimode waveguide according to claim 5, wherein the longitudinal variation $d_{pc}(z)$ in the transverse dimension $d_{pc}$ is decreasing over at least a portion of the concentrating structure ending on a downstream face of said concentrating structure relative to positions of increasing distance in a direction parallel to the longitudinal axis of the multimode optical fibre.

8. The multimode waveguide according to claim 5, wherein the longitudinal variation $d_{pc}(z)$ in the transverse dimension $d_{pc}$ is increasing over a portion of the concentrating structure extending from an upstream face of said concentrating structure relative to positions of increasing distance in a direction parallel to the longitudinal axis of the multimode optical fibre.

9. The multimode waveguide according to claim 1, wherein the concentrating structure has a length $L_p$ at least equal to two times the value $d_{fc}$ of the transverse dimension $d_{fc}$ of the core of the multimode optical fibre at the second face.

10. The multimode waveguide according to claim 1, wherein the ratio $d_{pc,in}/d_{pc,out}$ is higher than or equal to 2.

11. A light-emitting device comprising a light source and the multimode waveguide according to claim 1, the multimode waveguide being optically coupled to the light source via the first face of the multimode optical fibre.

12. A photodetection device comprising a photodetector and the multimode waveguide according to claim 1, the multimode waveguide being intended to transmit, via the exit face, an optical signal of wavelength $\lambda$ in the direction of the photodetector, the exit face making contact with a receiving surface of the photodetector, which receiving surface is intended to receive the optical signal, or is spaced apart therefrom by a distance smaller than or equal to $\lambda/n$, where n is the refractive index of a medium located between the exit face and the receiving surface of the photodetector.

13. A process for manufacturing a multimode waveguide according to claim 1, comprising the following steps:
producing at least one parallelepipedal segment made of the high-index material of the concentrating structure, from a wafer of the same material;
joining the parallelepipedal segment to the second face of the multimode optical fibre;
machining the parallelepipedal segment so as to obtain the adiabatic variation in the local transverse dimension $d_{pc}$ of the parallelepipedal segment, thus obtaining the concentrating structure.

14. A process for manufacturing a multimode waveguide according to claim 1, comprising the following steps:
producing a frustoconical segment on the second face of the multimode optical fibre;
depositing an encapsulating layer covering the at least the frustoconical segment;
removing the frustoconical segment by selectively etching the material thereof, thus freeing up an empty space bounded by the encapsulating layer;
depositing the high-index material of the concentrating structure thus filling the empty space, and thus forming the concentrating structure.

* * * * *